United States Patent [19]

Park et al.

[11] Patent Number: 4,518,624
[45] Date of Patent: May 21, 1985

[54] PROCESS OF MAKING A CORROSION-RESISTANT COATED FERROUS BODY

[75] Inventors: Dong-Sil Park; Robert J. Zabala, both of Schenectady, N.Y.

[73] Assignee: Electric Power Research Institute, Inc., Palo Alto, Calif.

[21] Appl. No.: 593,081

[22] Filed: Mar. 26, 1984

Related U.S. Application Data

[62] Division of Ser. No. 525,780, Aug. 24, 1983.

[51] Int. Cl.$^3$ .......................... C23C 11/04; C23C 7/00
[52] U.S. Cl. .................... 427/34; 427/383.9; 427/253
[58] Field of Search ...................... 427/253, 250, 383.7, 427/383.9, 34; 428/610, 663, 664, 666, 667, 684, 941; 429/104

[56] References Cited

U.S. PATENT DOCUMENTS

| | | | |
|---|---|---|---|
| 2,859,158 | 11/1958 | Schaer | 428/667 |
| 3,117,846 | 1/1969 | Chou | 428/664 |
| 3,959,013 | 5/1976 | Breiter | 429/104 |
| 4,131,226 | 12/1978 | Breiter et al. | 429/104 |
| 4,232,098 | 11/1980 | Park et al. | 428/667 |
| 4,234,668 | 11/1980 | Park et al. | 429/104 |

FOREIGN PATENT DOCUMENTS

| | | | |
|---|---|---|---|
| 69137 | 6/1976 | Japan | 429/104 |
| 20226 | 2/1977 | Japan | 429/104 |
| 2027751A | 2/1980 | United Kingdom | 427/383.9 |

Primary Examiner—L. Dewayne Rutledge
Assistant Examiner—John J. Zimmerman
Attorney, Agent, or Firm—Jane M. Binkowski; James C. Davis, Jr.; James Magee, Jr.

[57] ABSTRACT

A ferrous metal body having a diffusion bonded coating which is corrosion resistant and free of any significant polarization, the bulk of said coating being comprised an alloy of at least about 70% by weight molybdenum, up to about 5% by weight iron balance chromium, the outside surface or surface portion of said coating being comprised of an alloy of at least about 30% by weight chromium, up to about 1% by weight iron, balance molybdenum, said outside surface or outside surface portion of said coating being significantly richer in chromium than said bulk portion, and a diffusion bonding layer comprised of MoCrFe alloy extending from said bulk portion into the surface of said ferrous body, said diffusion bonding layer being comprised of at least about 10% by weight molybdenum, at least about 5% by weight chromium and at least about 10% by weight iron.

7 Claims, 4 Drawing Figures

PROCESS OF MAKING A CORROSION-RESISTANT COATED FERROUS BODY

This application is a division of application Ser. No. 525,780, filed Aug. 24, 1983.

The present invention is directed to molybdenum-base diffusion coating corrosion protection for ferrous metal bodies such as low carbon steel, and particularly to low carbon steel cans useful as a sulfur compartment in a sodium sulfur cell.

Low carbon steel cans used as sulfur compartments in sodium-sulfur cells are heavily corroded by the sulfur/sodium polysulfide melt during cycling. The corrosive attack causes a loss of cell capacity and increase in cell resistance, causing a decrease in the overall cell performance.

Mo is one of a few metallic elements which are known to form a stable, protective scale in the sulfur/sodium polysulfide melt. Many groups have studied Mo for sulfur container in sodium-sulfur cell applications. However, two serious shortfalls have been encountered: (1) cells with Mo or Mo-coated container showed unsatisfactory charge/discharge characteristics, which are generally attributed to polarization at the melt/Mo interface; (2) the cost of Mo is so high that utilizing Mo tubing as sulfur container is out of the question for practical applications. To overcome the cost problem, Mo has been utilized as coatings onto inexpensive substrates such as low carbon steel and Al.

One major approach for Mo coatings is physical coating such as made by plasma spray coating. Laboratory tests of low carbon steel container with plasma-spray coated Mo have shown that the coatings are too porous. Consequently, a heavy subscale is formed in a short test time and the coatings spalled off very easily.

Another major approach for Mo coatings are those made by low temperature chemical vapor deposition such as made by reduction of Mo-halides in $H_2$ atmosphere at about 650° C. The coatings are not fully diffusion-bonded to the substrate. Also, they are usually very thin (a few microns).

Yet another approach for Mo coatings are those made by high temperature pack molybdenizing process. Laboratory study has shown that coatings made onto low carbon steel by the process in the temperature range 1000°–1200° C. have a very low Mo level of less than 10%. In addition, the thickness of the coatings is very limited.

In addition to various shortfalls, the polarization problem still remains in these coatings because the melt is in direct contact with practically pure Mo (except for the coatings made by high temperature molybdenizing process).

The present invention is directed to a Mo-base coating which provides corrosion resistance without having the aforementioned shortcomings of Mo and Mo-coatings. The coatings are based on Mo-precoating followed by heating with an activator and Cr powder at an elevated temperature. The coatings have a thick layer of Mo-base coating diffusion-bonded to the substrate. Underneath the Mo layer Cr forms a thick Fe-Cr alloy layer, which will further enhance the corrosion resistance of the steel. In addition, Cr modifies the Mo layer in such a way that no polarization is observed in the coatings. Laboratory tests of cells with low carbon steel container with such Mo-base coating showed an excellent performance and an outstanding corrosion resistance.

The invention is directed to (1) a Mo-base coating process which imparts corrosion resistance to carbon and other steels, and (2) coated steel hardware as sulfur compartment in sodium-sulfur cell applications.

Those skilled in the art will gain a further and better understanding of the present invention from the detailed description set forth below, considered in conjunction with the figures accompanying and forming a part of the specification, in which.

Figure 1:
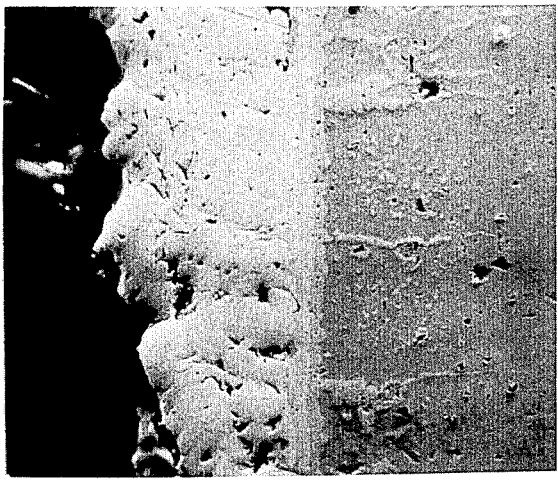
FIG. 1 is a photomicrograph (magnified 500×) showing the polished cross section of the present coated ferrous metal body which was a low carbon steel.

Briefly stated, the present process for producing a corrosion resistant coated ferrous metal body which is polarization free or which is free of significant polarization comprises providing a ferrous metal body, depositing a layer of molybdenum at least about 10 microns thick on the surface of said body, heating said molybdenum-layered body to a temperature ranging from about 800° C. to 1200° C., and diffusing chromium halide vapor through said molybdenum layer and into contact with the surface of said ferrous body producing a coating diffusion bonded to said ferrous metal body, the bulk of said coating being comprised of an alloy of at least about 70% by weight molybdenum, up to about 5% by weight iron balance of at least about 1% by weight chromium, the outside surface of said coating or outside surface portion extending from said bulk portion being comprised of an alloy ranging from about 30% by weight to about 80% by weight chromium, up to about 1% by weight iron balance molybdenum, said outside surface or outside surface portion being significantly richer in chromium than said bulk portion, said outside surface or outside surface portion containing sufficient chromium to make said coated body polarization free or free of any significant polarization, and a diffusion bonding layer comprised of MoCrFe alloy extending from said bulk portion into said metal body, said diffusion bonding layer being comprised of at least about 10% by weight molybdenum, at least about 5% by weight chromium and at least about 10% by weight iron.

The present ferrous metal body or substrate is a metallic body containing iron in an amount of at least about 50% by weight, generally at least about 80% by weight and higher, and preferably at least about 90% by weight and higher, of the ferrous metal body. The particular composition of the present ferrous metal body, i.e. the specific amount of iron and the remaining components therein, will depend on the particular application of the present coated ferrous metal body. However, the ferrous metal body should not contain any element which would have a significantly deleterious effect on the present process or product such as, for example, a significant amount of sulfur or phosphorus. Preferably, the present ferrous metal body is a low carbon steel. The term "low carbon steel" is commonly used and is used herein to describe well-known steels, particularly commercial steels, containing less than about 0.25% by weight carbon, the balance being iron and the usual impurities.

In carrying out the present process, a layer of molybdenum is deposited on the surface of the present ferrous metal body, i.e. on that area of the surface of the ferrous body to which corrosion resistance is to be imparted. Preferably, the layer of molybdenum is deposited by conventional techniques such as plasma spraying. The deposited molybdenum layer ranges in thickness from about 10 microns to about 1000 microns. A deposited layer of molybdenum less than about 10 microns in thickness is not useful since it would be too thin for practical applications. A molybdenum layer thicker than about 1000 microns provides no significant advantage. Preferably, for most applications and particularly for producing a coated body useful in a sodium sulfur cell, the deposited molybdenum layer ranges in thickness from about 50 microns to about 250 microns. The deposited layer is continuous and preferably it has a substantially uniform thickness. In the present invention, although the deposited molybdenum layer may be nonporous or porous, it ordinarily has some degree of porosity and such porosity should be less than 20% by volume, and preferably less than about 10% by volume, of the deposited molybdenum layer.

One preferred technique for depositing the layer of molybdenum metal is by plasma spraying of fine molybdenum powder. This technique is generally described in Kirk-Othmer, Encyclopedia of Chemical Technology, 2nd Ed., Interscience, N.Y., Vol. 13, p. 271, incorporated at this point by reference. The fine molybdenum powder, typically on the order of −325 mesh size, is sprayed under high pressure with a plasma spray gun against the surface of the ferrous metal body. The solid dry powder physically adheres to and coats the surface to form a layer of molybdenum metal. To facilitate physical adhesion, it is preferable to roughen the surface, as by sand blasting or the like, prior to spraying. This provides the additional advantage of cleaning the surface of the substrate.

The present chromium halide vapor can be that of the bromide, chloride, fluoride or iodide, and preferably it is chromium chloride vapor. The chromium halide vapor can be produced by a number of techniques. Generally, the chromium halide vapor is produced by reaction of halogen gas or a halide gas such as HCl gas, with chromium metal powder at temperatures ranging from about 700° C. to about 1100° C. The halogen gas or halide vapor such as HCl can be supplied from a pressurized tank or a similar suitable source. Normally, the chromium metal powder has a size less than about 150 microns and frequently ranges from about 50 microns to about 100 microns to promote reaction with the halogen or halide gas. Preferably, halogen gas and/or halide gas is generated by decomposition of a solid halide such as ammonium bromide, ammonium chloride, ammonium fluoride or ammonium iodide, and preferably, it is ammonium chloride.

The chromium halide vapor is produced and diffused onto and through the deposited molybdenum layer by a number of techniques which prevent introduction of contaminants to any significant extent into the final product. To prevent the introduction of contaminants, at least to any significant extent, the atmosphere in which chromium halide vapor is produced and diffused through the deposited molybdenum layer into contact with the ferrous metal body is selected from the group consisting of argon, hydrogen and mixtures thereof. It is typically done at about atmospheric pressure with a flowing atmosphere with typically a flow rate SCFH of about 0.2 to about 2.0.

The chromium halide vapor is contacted with the deposited molybdenum layer and diffused through the molybdenum layer into contact with the ferrous metal body at a temperature ranging from about 800° C. to about 1200° C. until the present product is produced. A temperature lower than about 800° C. is not useful since it would take too long to be practical to produce the present product. On the other hand, a temperature higher than about 1200° C. is not useful since it would diffuse the molybdenum into the ferrous metal body to a significant or substantial extent preventing production of the present diffusion bonded coating. Preferably, the present process is carried out at a temperature of about 1000° C.

One preferred technique for producing and diffusing the chromium halide vapor is by embedding the molybdenum-layered body in a packing powder comprised of a particulate mixture of ammonium halide, chromium metal powder and a filler which is inert in the present process. Typically, this packing powder has an average particle size ranging from about 50 microns to about 200 microns and is comprised of about 5% by weight to about 50% by weight chromium metal powder, from about 0.1% by weight to about 10% by weight ammonium halide powder, preferably ammonium chloride, and the balance is filler, preferably α-alumina. The molybdenum-layered ferrous metal body is packed within the packing powder and heated to decompose the ammonium halide producing ammonia and halogen and/or hydrogen halide gas which reacts with the chromium powder forming chromium halide vapor which diffuses through the molybdenum layer into contact with the ferrous metal body.

In the present process, as the chromium halide vapor contacts and diffuses through the molybdenum layer into contact with the surface of the ferrous metal body, a number of reactions occur which result in chromium being deposited on and in the molybdenum layer as well as onto the surface of the ferrous metal body or substrate. The presence of the deposited chromium reduces porosity in the resulting diffusion bonded coating at least significantly, and usually, substantially or drastically. Specifically, the chromium halide vapor diffusing through the molybdenum layer preferentially diffuses through the pores therein reacting with molybdenum and depositing chromium thereon and therein. Some of the molybdenum halide vapor, which also is produced, evaporates away and some of it deposits molybdenum on the ferrous metal body. When the chromium halide vapor contacts the surface of the ferrous metal body, it reacts with the iron component therein to deposit chromium and produces iron halide vapor which may vaporize away or which may diffuse through the molybdenum layer where it may deposit iron. The chromium deposited at the interface alloys and diffuses into the ferrous body producing diffusion bonding and the diffusion bonding layer comprised of molybdenum chromium iron alloy of the present coating. In addition, since chromium is deposited on the surface of the molybdenum layer and diffuses in, the outside surface or surface portion of the resulting coating is always significantly richer in chromium than the bulk of the coating.

The production of the present coated ferrous metal body is determinable empirically. The time period for producing the present coated body depends largely on the temperature at which the chromium halide vapor is diffused through the deposited molybdenum layer. Typically, at a temperature of about 1000° C., the present process is completed in about one to three hours.

The present coated ferrous metal body is comprised of a ferrous metal body or substrate having a diffusion bonded coating which is continuous and which contains no significant porosity. Preferably, the diffusion bonded coating is uniform or substantially uniform in thickness, and generally ranges in thickness from about 5 microns to about 500 microns, and preferably from about 50 microns to about 200 microns.

The present coated ferrous metal body is significantly corrosion resistant. It is significantly corrosion resistant to the sulfur/sodium polysulfide melt in a sodium sulfur cell. Also, the present coated ferrous metal body is free of polarization or does not show or exhibit any significant polarization. More specifically, the present coated ferrous body does not show any polarization or does not exhibit any significant polarization when used as a casing for sulfur in a sodium sulfur cell.

More specifically, the present coated ferrous metal body has a diffusion bonded coating which makes said body significantly resistant to corrosion and free of any significant polarization, the bulk of said coating being comprised of an alloy ranging from about 70% by weight to about 98% by weight molybdenum, up to about 5% by weight iron balance of at least about 1% by weight chromium, the outside surface of said coating or outside surface portion extending from said bulk portion being comprised of an alloy ranging from about 30% by weight to about 80% by weight chromium, up to about 1% by weight iron balance molybdenum, said outside surface or outside surface portion being significantly richer in chromium than said bulk portion and containing sufficient chromium to make said coated body free of any significant polarization, and a diffusion bonding layer extending from said bulk portion into the ferrous metal body comprised of MoCrFe alloy containing at least about 10% by weight molybdenum, at least about 5% by weight chromium and at least about 10% by weight iron.

The bulk of the present coating is comprised of an alloy ranging from about 70% by weight to about 98% by weight, and preferably from about 70% by weight to about 90% by weight, molybdenum, up to about 5% by weight iron and the balance is at least about 1% by weight chromium. The bulk of the coating lies between the outside surface or outside surface portion and the diffusion bonding layer and specifically, it is that portion of the coating not occupied by the outside surface or outside surface portion and the diffusion bonding layer, and therefore, the thickness of the bulk of the coating would be the thickness of the coating minus the thicknesses of the outside surface or outside surface portion and the diffusion bonding layer.

Partly due to the densifying effect of chromium, the pore volume or porosity of the bulk of the coating is less than about 5% by volume, and preferably less than about 2% by volume, of such bulk.

The outside surface or surface portion of the present coating is comprised of an alloy comprised of from about 30% by weight to about 80% by weight chromium, up to about 1% by weight iron, balance molybdenum and contains chromium in an amount sufficient to make the coating, i.e., coated body, polarization free or at least sufficient to make it free of any significant polarization. An amount of chromium less than about 30% by weight in the outside surface or outside surface portion will not make the coating or coated body at least significantly free of polarization. On the other hand, chromium in an amount greater than about 80% by weight provides no significant advantage. Preferably, the outside surface or outside surface portion of the coating contains from about 55% by weight to about 70% by weight chromium. Also, the outside surface or outside surface portion of the coating is significantly richer in chromium, i.e. at least about 5% by weight richer in chromium, than the bulk of the coating. The outside surface or outside surface portion of the coating has a thickness of at least about 50 Å, and its thickness varies depending on heating temperature and time. Typically, its thickness is of the order of about one micron.

The diffusion bonding layer of the present coating is comprised of MoCrFe alloy containing at least about 10% by weight molybdenum, at least about 5% by weight chromium and at least about 10% by weight iron, and its particular composition, can vary depending largely on such factors as heating temperature and time and the particular composition of the ferrous metal body such as, for example, its carbon content which may inhibit iron transport. Generally, the diffusion bonding layer is comprised of about 10% by weight to about 50% by weight molybdenum, from about 5% by weight to about 40% by weight chromium balance iron.

Under some heating conditions of the present process, the diffusion bonding layer is comprised of a plurality of sub or smaller layers, usually two sublayers, wherein the first sublayer extending from the bulk of the coating contains significantly less iron than the second sublayer which extends from the first sublayer. Generally, where the diffusion bonding layer is comprised of two sublayers, the first sublayer extending from the bulk of the coating has a composition comprised of from about 20% by weight to about 60% by weight of molybdenum, from about 10% by weight to about 40% by weight chromium, balance of at least about 10% by weight iron, and the second sublayer extending from the first sublayer generally has a composition comprised of from about 1% by weight to about 20% by weight molybdenum, from about 5% by weight to about 40% by weight chromium and balance iron.

The thickness of the diffusion bonding layer of the present coating can be varied significantly by changing the heating conditions of the present process. Specifically, the diffusion bonding layer has a minimum thickness of about 1 micron and preferably ranges in thickness from about 5 microns to about 20 microns. Most preferably, it has a thickness of about 10 microns. The pore volume or porosity of the diffusion bonding layer, partly due to the effect of chromium, is less than about 1% by volume of the diffusion bonding layer and ordinarily it is free of any noticeable or detectable pores or porosity. The present diffusion bonding layer strongly bonds the present coating to the ferrous metal body.

In another embodiment of the present invention, the present coated ferrous metal body has a diffusion layer in the ferrous metal body extending from the diffusion bonding layer of the coating. The extent to which the diffusion layer extends into the ferrous metal body as well as the composition of the diffusion layer depends largely on heating conditions, i.e. temperature and time, as well as the type of ferrous metal body or substrate. Generally, the diffusion layer in the ferrous metal body is comprised of an alloy of from about 5% by weight to about 40% by weight chromium, less than about 5% by weight molybdenum balance iron. Also, the diffusion layer in the ferrous metal body has a thickness of at least about 2 microns, and generally, it ranges in thickness from about 10 microns to about 200 microns. The presence of the diffusion layer in the ferrous metal body provides the product with an additional advantage and that is significant additional corrosion resistance.

The present coated ferrous metal body has a number of uses. It is particularly useful as a casing in a sodium sulfur cell especially the casing for the sulfur compartment. An example of a sodium sulfur cell is disclosed in U.S. Pat. No. 3,960,596 which is incorporated herein by reference. It should also be useful as a casing in a lithium iron sulfide battery.

The invention is further illustrated by the following examples:

EXAMPLE 1

Five low carbon steel cans formed of AISI 1015 steel, each open at one end and closed at the opposite end and each having an inner diameter of about 0.930 inch, a length of about 3 inches and a thickness of about 35 mils were used.

The entire side of each can was coated with molybdenum powder (−325 mesh) by plasma spraying to a thickness of about 125 microns. Spraying was done with a Metco Type 3M Plasma Flame Spray System with a mixture of argon and hydrogen as plasma gas.

The layer of molybdenum deposited inside each can was substantially uniform, continuous and porous with a porosity of less than about 10% by volume of the molybdenum layer.

Each of the molybdenum layered cans was embedded in a pack comprised of a particulate mixture of 20% by weight chromium, 2% by weight NH$_4$Cl and the balance α-alumina powder contained in a stainless steel retort. The mixture had an average particle size of about 50 microns.

The retort containing the packed cans was then heated at 1050° C. for two hours in argon wherein the argon had a flow rate of about 1 SCFH.

All of the resulting coated steel cans had a continuous coating which was fully diffusion bonded to the steel cans. The thickness of the discrete portion of each coating, i.e. the bulk of the coating including the outside surface portion, was about 50 microns thick.

FIG. 1 shows the microstructure of a polished cross section of one of these coated steel cans.

Figure 2:
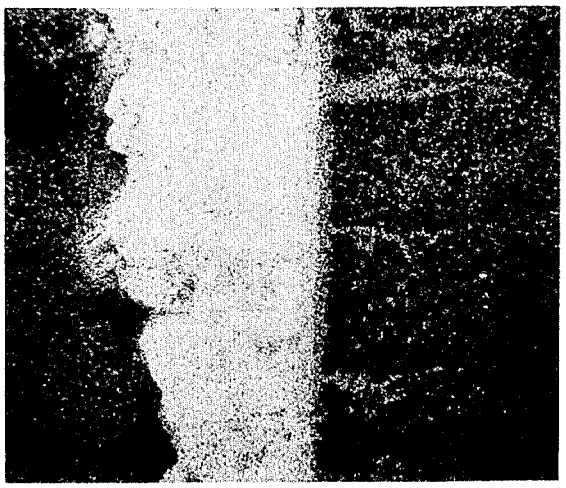
FIG. 2 is an X-ray image of Mo in the cross section shown in FIG. 1 and is of the same magnification as FIG. 1.
Figure 3:
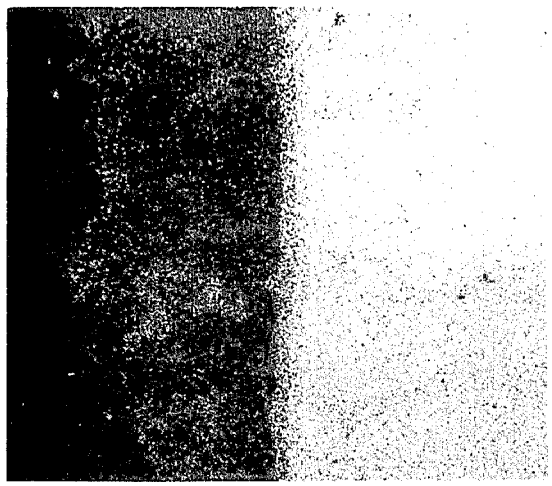
FIG. 3 is an X-ray image of Fe in the cross section shown in FIG. 1 and is of the same magnification as FIG. 1.
Figure 4:
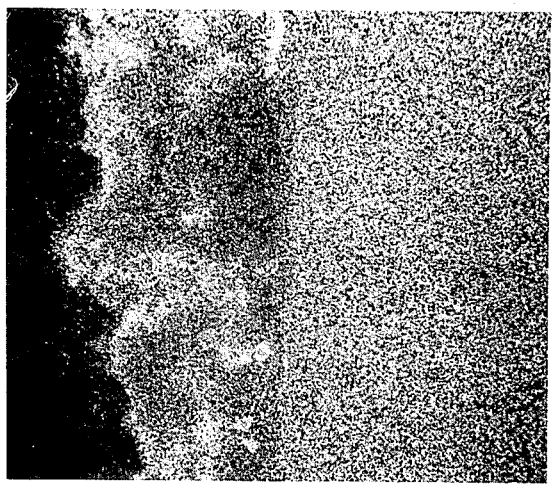
FIG. 4 is an X-ray image of Cr in the cross section shown in FIG. 1 and is of the same magnification as FIG. 1.

FIGS. 2, 3 and 4 show X-ray density mappings of Mo, Fe and Cr, respectively, in the same cross section. As shown by the figures, the bulk of the coating was almost free of Fe. The figures show that the bahavior of Cr was particularly important. The outside surface or outside surface portion of the coating showed a substantial level of Cr. Cr has also diffused into Mo layer somewhat nonuniformly, which appears to be due to preferential deposition of Cr through pores originally present in the Mo layer. A high level of Cr was observed in the steel substrate to a significant depth (about 100 microns) underneath the coating, i.e. in the diffusion layer in the steel body. The formation of such Fe-Cr alloy diffusion layer or essentially stainless steel will provide a further corrosion resistance to the steel substrate. The density of the coating, i.e. the lack of any significant porosity in the coating, is due to the deposition and subsequent diffusion of Cr as observed in the X-ray density mapping (FIG. 4).

More specifically, the bulk of the coating contained less than about 5% by volume porosity. Based on the figures, other experiments and experience, the bulk of the coating was comprised of MoCrFe alloy of more than about 70% by weight molybdenum, less than about 1% by weight iron and more than about 1% by weight chromium.

The outside surface or outside surface portion of the coating was of the order of about 1 micron in thickness. Based on the figures, other experiments and experience, the outside surface or outside surface portion was comprised of an alloy of from about 55% by weight to about 65% by weight chromium balance molybdenum with trace levels of iron.

The diffusion bonding layer extending from the bulk of the coating into the steel body was continuous and contained no detectable porosity. It was of the order of about 1 micron in thickness and was comprised of an MoCrFe alloy. Based on the figures, other experiments and experience, the diffusion bonding layer was comprised of at least about 10% by weight molybdenum, at least about 5% by weight chromium and at least about 10% by weight iron. In this instance, the diffusion bonding layer was comprised of two sublayers wherein the first sublayer extending from the bulk of the coating contained significantly less iron than the second sublayer.

Based on the figures, other experiments and experience, the thick layer of about 20 microns thickness in the steel body extending from the diffusion bonding layer, i.e. the diffusion layer in the steel body, was comprised of an alloy of approximately 30% by weight chromium, less than about 5% by weight molybdenum balance iron.

EXAMPLE 2

Three of the coated steel cans produced in Example 1 were used as containers for sulfur in three laboratory sodium sulfur cells.

After 54 days on test, Cell #383 was taken out for examination of the coated steel container.

Post-test examination of container #383 showed a uniform and adherent scale. The scale was very thin (less than 2-micron thick) indicating that the coated steel container was very resistant to corrosion. In comparison, low carbon steel containers with plasma spray coated Mo showed a heavy scale after similar cell tests, and the Mo coating itself spalled off.

Cell #467 was on test for 439 days and Cell #469 was on test 350 days. At the end of these time periods, the cells were removed because they failed due to the failure of the beta-alumina ceramic electrolyte therein.

Examination of the coated steel containers #467 and #469 also showed a uniform and adherent scale. Also, the scale was very thin (less than 5 microns thick) indicating that the coated steel containers were very resistant to corrosion under the operating conditions of the cells.

Very good cell charge/discharge characteristics were observed in all three cells, i.e. the cells showed a very good capacity and exhibited no significant polarization. Based on other experiments, the lack of any significant polarization shown by these cells was due to the coated steel containers of the present invention. The cells have shown a behavior typical of cells with chromized steel container which have shown excellent charge/discharge behavior in a very repeatable manner.

It is particularly noted that none of the cells has shown any indication of polarization behavior observed in cells with Mo or other Mo-coated containers. In other words, the presence of Cr on the surface of the coating suppresses the polarization behavior to the extent that no unfavorable effect is seen in cell tests.

What is claimed is:

1. A process for producing a corrosion resistant coated ferrous metal body which is polarization free or which is free of significant polarization, said coated body being useful as a component in a sodium sulfur cell wherein said coating is in contact with said sulfur, said process comprises providing a ferrous metal body, depositing a layer of molybdenum at least about 10 microns thick on the surface of said body, heating said molybdenum-layered body to a temperature ranging from about 800° C. to 1200° C., and diffusing chromium halide vapor through said molybdenum layer and into contact with the surface of said ferrous body producing a coating diffusion bonded to said ferrous metal body, the bulk of said coating consisting essentially of an alloy of at least about 70% by weight molybdenum, up to about 5% by weight iron balance of at least about 1% by weight chromium, the outside surface of said coating or outside surface portion extending from said bulk portion consisting essentially of an alloy ranging from about 30% by weight to about 80% by weight chromium, up to about 1% by weight iron balance molybdenum, said outside surface or outside surface portion being significantly richer in chromium than said bulk portion, said outside surface or outside surface portion containing sufficient chromium to make said coated body polarization free or free of any significant polarization, and a diffusion bonding layer comprised of MoCrFe alloy extending from said bulk portion into said metal body, said diffusion bonding layer consisting essentially of at least about 10% by weight molybdenum, at least about 5% by weight chromium and at least about 10% by weight iron.

2. The process according to claim 1 wherein said chromium halide vapor is chromium chloride.

3. The process according to claim 1 wherein said temperature is about 1000° C.

4. A process for producing a corrosion resistant coated low carbon steel body which is polarization free or which is free of significant polarization, said coated body being useful as a component in a sodium sulfur cell wherein said coating is in contact with said sulfur, said process comprises providing a low carbon steel body, depositing a layer of molybdenum at least about 10 microns thick on the surface of said body, heating said molybdenum-layered body to a temperature ranging from about 800° C. to 1200° C., and diffusing chromium halide vapor through said molybdenum layer and into contact with the surface of said steel body producing a coating diffusion bonded to said steel body, the bulk of said coating consisting essentially of an alloy of at least about 70% by weight molybdenum, up to about 5% by weight iron balance of at least about 1% by weight chromium, the outside surface of said coating or outside surface portion extending from said bulk portion consisting essentially of an alloy ranging from about 30% by weight to about 80% by weight chromium, up to about 1% by weight iron balance molybdenum, said outside surface or outside surface portion being significantly richer in chromium than said bulk portion, said outside surface or outside surface portion containing sufficient chromium to make said coated body polarization free or free of any significant polarization, and a diffusion bonding layer consisting essentially of MoCrFe alloy extending from said bulk portion into said steel body, said diffusion bonding layer consisting essentially of at least about 10% by weight molybdenum, at least about 5% by weight chromium and at least about 10% by weight iron.

5. The process according to claim 4 wherein said chromium halide vapor is chromium chloride.

6. A process for producing a corrosion resistant coated ferrous metal body which is polarization free or which is free of significant polarization, said coated body being useful as a component in a sodium sulfur cell wherein said coating is in contact with said sulfur, said process comprises providing a ferrous metal body, depositing a layer of molybdenum at least about 10 microns thick on the surface of said body, heating said molybdenum-layered body to a temperature ranging from about 800° C. to 1200° C., and diffusing chromium halide vapor through said molybdenum layer and into contact with the surface of said ferrous body producing a coating diffusion bonded to said ferrous metal body, the bulk of said coating consisting essentially of an alloy of at least about 70% by weight molybdenum, up to about 5% by weight iron balance of at least about 1% by weight chromium, the outside surface of said coating or outside surface portion extending from said bulk portion consisting essentially of an alloy ranging from about 30% by weight to about 80% by weight chromium, up to about 1% by weight iron balance molybdenum, said outside surface or outside surface portion being significantly richer in chromium than said bulk portion, said outside surface or outside surface portion containing sufficient chromium to make said coated body polarization free or free of any significant polarization, and a diffusion bonding layer consisting essentially of MoCrFe alloy extending from said bulk portion into said metal body, said diffusion bonding layer consisting essentially of at least about 10% by weight molybdenum, at least about 5% by weight chromium and at least about 10% by weight iron, and a diffusion layer in said ferrous metal body extending from said diffusion bonding layer, said diffusion layer consisting essentially of an alloy of from about 5% by weight to about 40% by weight chromium, less than about 5% by weight molybdenum balance iron.

7. A process for producing a corrosion resistant coated low carbon steel body which is polarization free or which is free of significant polarization, said coated body being useful as a component in a sodium sulfur cell wherein said coating is in contact with said sulfur, said process comprises providing a low carbon steel body, depositing a layer of molybdenum at least about 10 microns thick on the surface of said body, heating said molybdenum-layered body to a temperature ranging from about 800° C. to 1200° C., and diffusing chromium halide vapor through said molybdenum layer and into contact with the surface of said steel body producing a coating diffusion bonded to said steel body, the bulk of said coating consisting essentially of an alloy of at least about 70% by weight molybdenum, up to about 5% by weight iron balance of at least about 1% by weight chromium, the outside surface of said coating or outside surface portion extending from said bulk portion consisting essentially of an alloy ranging from about 30% by weight to about 80% by weight chromium, up to about 1% by weight iron balance molybdenum, said outside surface or outside surface portion being significantly richer in chromium than said bulk portion, said outside surface or outside surface portion containing sufficient chromium to make said coated body polarization free or free of any significant polarization, and a diffusion bonding layer consisting essentially of MoCrFe alloy extending from said bulk portion into said steel body, said diffusion bonding layer consisting essentially of at least about 10% by weight molybdenum, at least about 5% by weight chromium and at least about 10% by weight iron, and a diffusion layer in said steel body extending from said diffusion bonding layer, said diffusion layer consisting essentially of an alloy of from about 5% by weight to about 40% by weight chromium, less than about 5% by weight molybdenum balance iron.

* * * * *